United States Patent Office

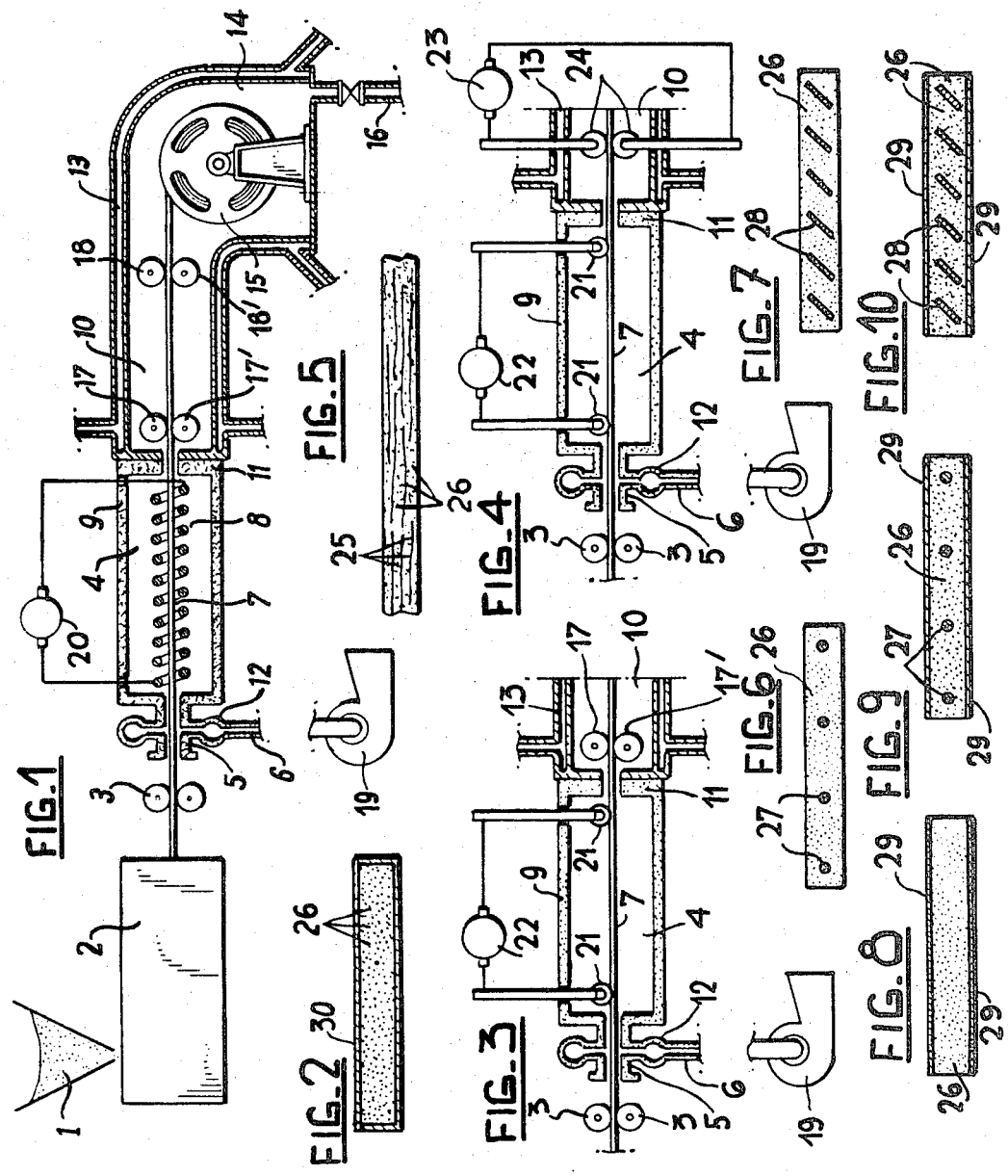

3,430,031
Patented Feb. 25, 1969

3,430,031
ELECTRODE AND PROCESS FOR MAKING SAME
Jean Albert Francois Sunnen, Uccle, Belgium, assignor to La Soudure Electrique Autogene, Procedes Arcos, Brussels, Belgium, a corporation of Belgium
Filed Nov. 8, 1965, Ser. No. 506,795
Claims priority, application France, Nov. 17, 1964, 995,161
U.S. Cl. 219—146
Int. Cl. B23k 35/40; B22f 7/00
9 Claims

ABSTRACT OF THE DISCLOSURE

A process of manufacturing a filler product for surfacing, overlaying or welding metals by continuously forwardly feeding a mixture of powders, continuously introducing longitudinally arranged fibers, metallic wires or metallic ribbons into the mixture of powders, continuously compressing the mixture of powders with the longitudinal fibers, wires or ribbons into a strip and sintering the compressed strip. Optionally the sintered strip is continuously enclosed in a sheet metal sheath. Optionally also a layer of ionizing elements is applied to the periphery of the compressed strip.

---

The present invention is related to a filler product in the form of a strip or to an electrode for the surfacing, the overlaying or the welding of metal pieces by means of an electric arc or of another heat source for example a flame and to its process of manufacture.

It is known that in the coated electrodes or in the filler products for surfacing, overlaying or welding, there are often, as well in the core of the electrode as in the coating, substances capable of evolving gases in an arc or in a flame and belatedly in the bath of molten metal and of giving rise to the usual welding defects.

The means used in the process according to the invention remove these defects. They consist in that the usual successive operations of extrusion, of compacting or of hot or cold rolling of powders, are followed by a sintering, in certain cases under a protective atmosphere or under vacuum, in order to obtain a continuous strip.

The annexed drawings which represent apparatus for carrying out the process according to the invention and filler strips obtained by this process, facilitate the understanding of the latter in combination with the following description.

FIGURE 1 is partially an elevation and partially a longitudinal section of an apparatus for carrying out the process according to the invention.

FIGURE 2 is a transverse section of a filler strip manufactured in the installation according to FIGURE 1.

FIGURES 3 and 4 represent parts of installations similar to FIGURE 1, in which the heating necessary for the sintering is effected by other means than in FIGURE 1.

FIGURE 5 is a longitudinal section of part of a modified filler strip according to the invention.

FIGURES 6 to 10 are transverse sections of other filler strips obtained by the process according to the invention.

In a first stage of the manufacture carried out by the apparatus shown in FIGURE 1, a mixture of powders contained in a hopper 1 above a station 2 is fed continuously into this station in order to be compacted or rolled by known means in the form of a strip or section. The strip 7 obtained at the exit of this station passes between guiding rollers 3 and enters into an oven 4 through a part 5 of a cross section much smaller than that of the oven. The latter is connected by a collector 12 and a pipe 6 to an exhaust pump 19 which exerts a vacuum in the oven or which applies suction to inert gases or hydrogen which pass in this oven.

In the oven shown in FIGURE 1, the strip or section 7 is moved into a heating inductor 8 coaxial to the oven where it is sintered. This conductor receives high frequency alternating current from a source 20. After the oven 4, the strip passes into a cooling tunnel 10 which is separated from the oven by a heat insulating wall 11 having in its median part a slot through which are sintered strip passes. The tunnel 10 is surrounded by a cooling chamber 13 and presents a larger portion 14 in which is disposed a rotating drum 15 in which the finished strip is wound. The enlarged portion 14 is provided with a cock 16 for the admission of gas, for example inert gas or hydrogen.

The filler strip may optionally be surrounded by a metallic sheath. In this case, a metallic ribbon must be fed by a device, contained in a manner known per se, in the interior of the station 2, while shaping rollers 17 and 17' are provided in the tunnel 10. The filler strip obtained in this manner is shown in FIGURE 2 where it is seen that a mixture of powders 26 is surrounded by a metallic sheath 30.

The sintering of the strip may be carried out by means other than the inductor 8, for example, by electric resistance heating through the strip 7 as shown in FIGURE 3 where two contacting rollers 21 are connected to a source of current 22.

The sintering may also be effected as in FIGURE 4 by passage of the strip between contacting rollers 24 of a resistance welding machine receiving current from a source 23. In this case, it might be preferable to preheat the strip in the oven 4 in order to prevent a too strong thermal shock between the contacting rollers 24. This preheating is for example effected by resistance heating in a manner similar to that shown in FIGURE 3.

The rollers 17 and 17' of FIGURE 1 may simultaneously shape the hot strip while two additional rollers 18 and 18' complete the shaping by cold rolling.

All the electrodes obtained by the invention present the advantages of the process. However, the advantages are still greater in case where the set of manufacturing operations according to the invention is applied with a view to obtain certain types of electrodes hereinafter described.

The filler material is composed of non-metallic or of metallic powders or of a mixture of the two kinds of powders. The powders may be simply mixed before their compacting or be agglomerated before their compacting. In the case of previous agglomeration, the latter is carried out by means of a binder or by sintering.

The metallic powders may be composed of alloys and the non-metallic powders be composed of prefused substances or by a mixture of nonfused substances.

The mixtures may comprise up to 50% of non-metallic substances. Ionizing ingredients are often contained in the mixture.

If it is desired to obtain high cohesion of the electrode, metallic, mineral or organic fibers 25 (FIGURE 5) are incorporated in the mixture of powders 26. The fibers are disposed longitudinally in the mixture prior to pressing. For the same purpose, and in particular when the electrode has a flat section, metallic wires 27 (FIGURE 6) or ribbons 28 (FIGURE 7) are disposed longitudinally. The space between the wires 27 or ribbons 28 is constituted by the powder mixture 26. If ionizing ingredients are provided, these ingredients are preferably disposed near the periphery as in the electrode of FIGURE 8 where it is seen that two layers of ionizing ingredients 29 are applied against the two large faces of the mixture of powders 26. These layers 29 may also be applied on the electrode of FIGURE 6 or of FIGURE 7 as shown in FIGURES 9 and 10 respectively.

The compactness of the filler product may be adjusted as described with a view to diminish the explosion risk during fusion, due to sudden escape of gases in the electric arc or in the flame used for melting the filler product, or with a view to reduce the penetration, or still with a view to increase the melting speed.

If the compacting, the rolling or the extrusion are effected in such a manner that a porous filler electrode is obtained, the escape of the gases in the portion of the electrode situated above the arc or flame is made easier.

In order to control the flow of gas through the powder metal strip, the apparent density in the green strip should be in the range of 5 to 7.5 and preferably 5.5 to 6.5 grams per cubic centimeter in the case of carbon and low alloy steels, and suitably in the same range for the sintered strip. The apparent density is determined initially by the pressure between the forming rolls, the amount of powder between the rolls, the roll size, the flowing properties of the powder and the particle size. Porosity of the sintered strip can be reduced by hot or cold rolling. Porosity of the strip can also be increased by including a volatile ingredient (such as sodium stearate) and then volatilizing it.

Moreover, in the case of fusion of the electrode in an arc, it presents a high electric resistance between the contacting members feeding the current and its melting end. Due to this resistance, during the surfacing, the overlaying or the welding, relatively low currents cause an important electric resistance heating effect and consequently the deposition rate is high but the penetration is shallow, reducing dilution.

Among the advantageous applications of the invention, the deposit of stainless steels with low carbon content, of Stellites, of Monel alloy and Inconel alloy may be specially mentioned. The fact that the filler electrode is not a true alloy does not hinder the application of the invention since the alloy is created by melting in the arc or flame.

It is evident that the filler electrode or product according to the invention may be used for surfacing, overlaying or welding with protective atmospheres such as inert gases, CO₂ and other gases. It may also be used in open air or in the submerged arc process. In the case of its use in open air, it may advantageously contain ingredients capable of evolving protective gases.

Having thus described my invention what I claim as new and desire to secure by Letters Patent is:

1. Process of manufacturing a filler product for surfacing, overlaying or welding metals, comprising continuously forwardly feeding a mixture of powers, continuously introducing longitudinally arranged fibers into the mixture of powders, continuously compressing the mixture of powders with the longitudinal fibers into a strip, and sintering the compressed strip.

2. Process as claimed in claim 1, comprising continuously feeding sheet metal, and forming a sheath of said sheet metal surrounding the sintered strip.

3. Process as claimed in claim 1, comprising applying a layer of ionizing elements at the periphery of the compressed strip.

4. Process of manufacturing a filler product for surfacing, overlaying or welding metals, comprising continuously forwardly feeding a mixture of powders, continuously introducing longitudinally arranged metallic wires into the mixture of powders, continuously compressing the mixture of powders with the longitudinal wires into a strip and sintering the compressed strip.

5. Process according to claim 4, comprising continuously forwardly feeding sheet metal and continuously forming a sheet of said sheet metal surrounding the sintered strip.

6. Process according to claim 4, comprising continuously applying a layer of ionizing elements at the periphery of the compressed strip.

7. Process of manufacturing a filler product for surfacing, overlaying, or sintering metals, comprising continuously forwardly feeding a mixture of powders, continuously introducing longitudinally arranged metallic ribbons into the mixture of powder, continuously compressing the mixture of powders with the longitudinal metallic ribbons into a strip, and sintering the compressed strip.

8. Process as claimed in claim 7, comprising continuously forwardly feeding sheet metal, and forming a sheath of said sheet metal surrounding the sintered strip.

9. Process as claimed in claim 7, comprising continuously applying a layer of ionizing elements at the periphery of the compressed strip.

References Cited

UNITED STATES PATENTS

| | | | |
|---|---|---|---|
| 2,121,194 | 6/1938 | Hardy | 75—200 X |
| 2,160,659 | 5/1939 | Hensel | 75—200 X |
| 2,180,813 | 11/1939 | Marvin | 75—200 X |
| 2,365,085 | 12/1944 | Jarrett | 75—208 X |
| 3,031,300 | 4/1962 | Deutsch | 75—226 X |
| 3,035,334 | 5/1962 | Salt | 75—214 X |
| 3,137,594 | 6/1964 | Bickerman. | |
| 3,231,332 | 1/1966 | Jones | 29—182.2 |

RICHARD M. WOOD, *Primary Examiner.*

B. A. STEIN, *Assistant Examiner.*

U.S. Cl. X.R.

75—200